(12) United States Patent
DeWaard

(10) Patent No.: US 7,631,595 B1
(45) Date of Patent: Dec. 15, 2009

(54) FORCE CONVECTION MILK PASTEURIZER

(75) Inventor: Ryan DeWaard, Lynden, WA (US)

(73) Assignee: Daritech, Inc., Lynden, WA (US)

( * ) Notice: Subject to any disclaimer, the term of this patent is extended or adjusted under 35 U.S.C. 154(b) by 677 days.

(21) Appl. No.: 11/304,194

(22) Filed: Dec. 14, 2005

(51) Int. Cl.
*A47J 31/00* (2006.01)

(52) U.S. Cl. .......................... 99/453; 99/452; 165/136; 165/154; 165/175

(58) Field of Classification Search ........... 99/452–466, 99/352–355, 483, 485–489, 516, 536, 348; 165/65–67, 167–169, 175, 144, 136, 154–156, 165/234; 137/169, 256, 334; 366/149, 293; 426/580–583; 219/483, 401; 126/378.1, 126/41 R
See application file for complete search history.

(56) References Cited

U.S. PATENT DOCUMENTS

| | | | |
|---|---|---|---|
| 1,825,443 A * | 9/1931 | Chormann et al. | 137/169 |
| 1,918,914 A * | 7/1933 | Jacobsen | 99/454 |
| 1,984,956 A | 12/1934 | Anglim | |
| 2,392,021 A * | 1/1946 | Wildermuth | 165/234 |
| 2,545,371 A * | 3/1951 | Mojonnier et al. | 165/154 |
| 2,568,653 A * | 9/1951 | Mojonnier et al. | 165/136 |
| 2,650,980 A | 9/1953 | Popow | |
| 4,694,333 A | 9/1987 | Ruger | |
| 4,802,407 A | 2/1989 | Negri et al. | |
| 4,869,164 A | 9/1989 | Takeyama | |
| 5,031,518 A | 7/1991 | Bordes | |
| 5,074,201 A | 12/1991 | Takeyama | |
| 5,670,199 A | 9/1997 | Swartzel et al. | |
| 5,834,739 A | 11/1998 | Lockwood | |
| 5,852,965 A | 12/1998 | Kim | |
| 5,882,113 A | 3/1999 | Binder | |
| 6,283,625 B2 | 9/2001 | Frankel et al. | |

* cited by examiner

*Primary Examiner*—Timothy F. Simone
(74) *Attorney, Agent, or Firm*—Michael F. Hughes; Hughes Law Firm, PLLC

(57) ABSTRACT

A milk pasteurizing unit having a force fluid convection chamber which is adapted to hold a milk product mass therein. There is an ejection nozzle which is in communication with a pressurization device such as a pump which forcefully ejects a nozzle over a separator plate which separates the milk product mass from a direct heat source such as a combustion chamber. The force convection of the milk prevents scalding of the same and allows for a more rapid heat transfer from the heat source to the milk product mass.

12 Claims, 3 Drawing Sheets

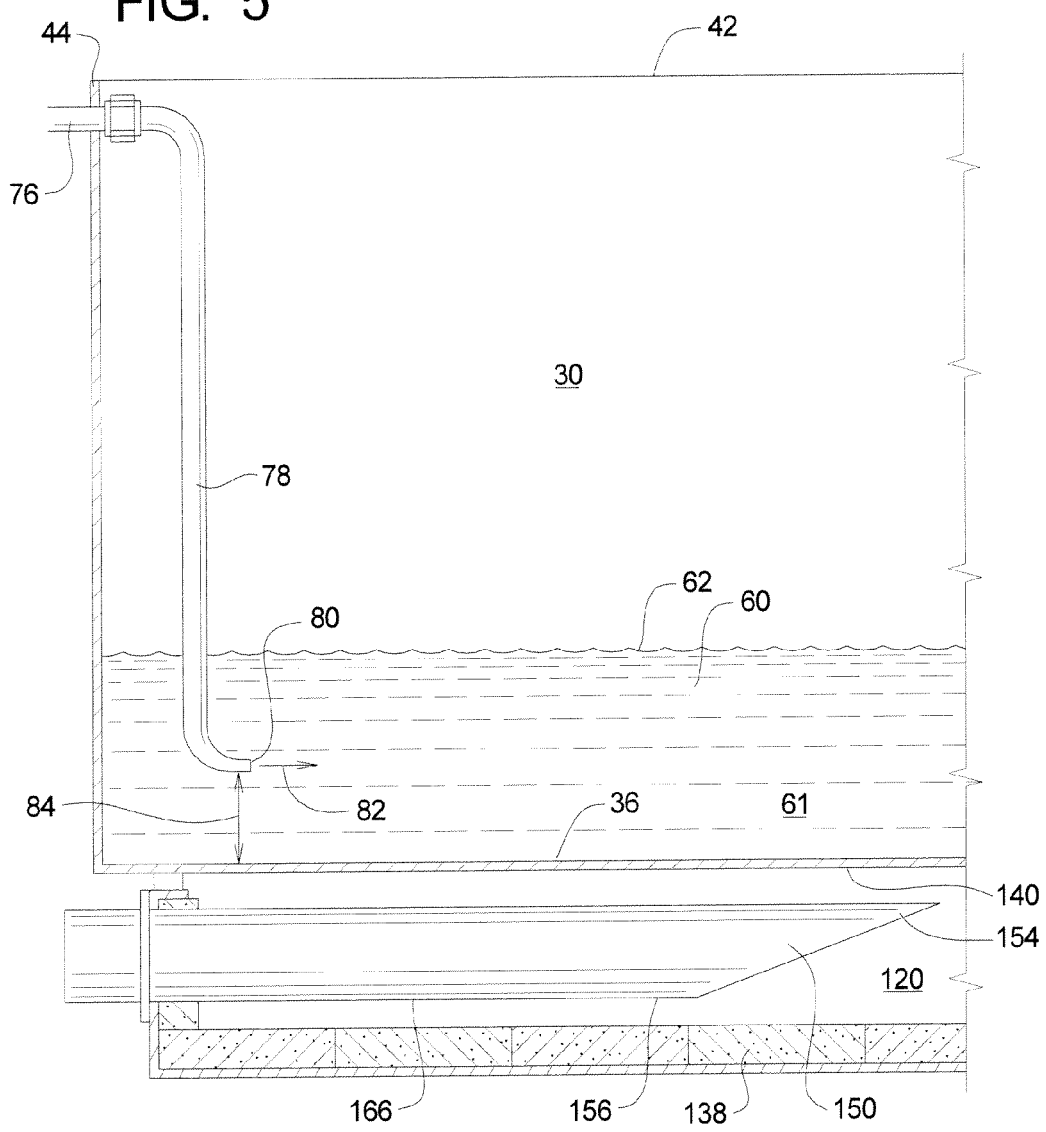

FORCE CONVECTION MILK PASTEURIZER

BACKGROUND AND GENERAL DISCUSSION

In general, the subject matter relates to pasteurizers for pasteurizing milk from harmful bacteria. The prior art devices generally have heat exchangers where water is used in a countercurrent between the tube or plate heat exchangers to heat up milk passing therethrough. The disadvantage of this is that water heaters can generally be rather expensive, and further, there are issues of cleaning the heat exchangers in the event that scalding or other depository type buildup occurs within the heat exchanger. Heat exchangers are not known for being easy to clean, so an alternative method of heating the milk for pasteurizing purposes is a present need in the marketplace.

The water contained in prior art heat exchange systems is in a close loop circulation which is the sole purpose of having heat transferred to the product. This water is not potable, and the heater is absolutely dedicated to the pasteurizer.

In general, for proper pasteurization, there is an FDA scale that has a valuation for determining the proper amount of time and temperature for pasteurization of milk products. In one form, a lower temperature at a longer period of time will function as a proper pasteurization duration. Alternatively, a higher temperature for a lower period of time will function as well. For example, having the milk product at approximately 145° F. for 30 minutes is considered a proper pasteurization cycle. Alternatively, having the milk at approximately 161° for 15 seconds will also be a sufficient temperature and time combination for proper pasteurization.

As described herein in detail, the disclosure provides a central chamber region, there is a first end having a discharge nozzle from a pump unit where on the opposing longitudinal end there is an intake portion which is in communication with the discharge. The discharge and input ends are adapted to circulate the product rather violently across the lower base surface of the central chamber region. It should be noted that the bottom portion is in direct contact (or direct thermal communication) with an open-flame chamber positioned therebelow. The open-flame chamber is powered by a gaseous, combustible fluid such as liquid propane or natural gas. Heat transfer passes up vertically and is essentially contained in the lateral and lower portions as well as longitudinal forward rearward portions by a fire block which has insulating properties. Therefore, the least path of thermal resistance is upward to the milk chamber where the milk product is contained. By passing the milk product at a fairly high rate of velocity, the milk convection is adapted to have a high rate of heat transfer without having a localized heat transfer to any milk particle which hence causes scalding. However, there is further a thermal couple which is connected to a PLC controller which monitors the temperature of the milk.

Present analysis indicates in various journals that having the high temperature short time (HTST) is more advantageous because there are theories presently circulating indicating that the hemoglobin around certain particles of milk will act as an insulating layer, thereby not allowing heat transfer to the inner particle portions. The present embodiment employs force convection across the heating surface, which should perhaps assist not only in preventing scalding and having a higher temperature heat source, but further prevent any such insulating boundaries within the particles from being formed, or if they are formed, breaking them up.

With regard to additional features of the disclosure, there is a "Clean in Place" (CIP) system. This system is in effect after all the product is removed after a pasteurization cycle. In general, after the unit is emptied, the unit is rinsed out with warm water to clear out all high volume of foam milk solids and so forth.

The pump has the synergistic effect of working as three different functions at three different times during the operation of the unit. Of course, the first and primary unit is circulation of the product during the pasteurization where the high volume flow prevents any scalding or increasingly high localized heat transfer to any portion of the fluid product. Further, the hose in the longitudinally rearward portion can be detached where the pump can function as filling up small container bottles that are adapted to have nipples placed thereon and fed to calves or any other external container for transporting of the pasteurized milk. Further, on the inward portion within the chamber region of the cleaning unit, an additional nozzle can be placed there to disperse cleaning fluid in a desirable pattern to clean out the central chamber area after a pasteurization cycle.

There is further a throttle control with the valve for reducing the rate of flow to the dispersion nozzles for filling external smaller tanks or containers. In one form the pump is adapted to operate at variable forms.

As noted in the figure showing the exposed fire blocks, the flame jet extends in the longitudinally forward direction with the under-portion exposed to allow flames to disperse therefrom. In this orientation the flame jet extends to the forward longitudinal portions for a dispersion of the flame throughout the under-portion of the milk chamber. In the lower portion there is a discharge flute where there is a desirable flow of the combusted gas to the discharge flute which of course is fluted up to a proper external exhaust away from the unit.

Therefore, it should be reiterated that the general theme of the invention is that conventional wisdom is to heat milk with a thermal capacitance intermediate layer between a heat source such as a wire coil, combusted material, or any other conventional heat source, and the actual product which cannot get too hot because of scalding and other associated problems. Therefore, having a heat source which is in direct thermal communication by a thin piece of highly conductive material such as stainless steel is not an intuitive leap. However, by having a strong convection current of the milk passing over this directly heated unit where the convection is at a constant, continuously flowing rate, there is not a localized heat transfer to any one single water molecule or portion of that fluid. Further, present theoretical analysis indicates that a higher temperature is advantageous for purposes of having heat transferred to potential water clumplets within the product that act as a thermal barrier for having heat transfer to the center of those "hemoglobin clumplets". However, as mentioned previously, present analysis indicates that the circulation has a synergistic effect of breaking up or preventing such clumplets so such heat transfer is provided to all portions of the product. Essentially, there is a lot of stirring going on so that the milk doesn't clump or heat up too much. There is further agitated air in the combustion chamber having a force convection effect down thereunder to have a more uniform heat transfer coming from the under-portion.

It should be reiterated that the lower substantially planar surface of the chamber is not an ideal heat transfer surface area. Normally, if you look at any type of heat transfer unit such as a radiator, there is a plurality of thin-like structures that are adapted to have heat conducted therethrough. In general, the thin structures are made of a highly thermally conductive material, such as metal, and are adapted to draw heat from the heat source to the low temperature area. However, this heat transfer may have adverse effect in this application where the transfer of the heat could have localized hot spots which cause an undesirable scalding and other effects to the milk product.

Therefore, the unit described herein has thermal efficiency in that it utilizes energy by way of the combustible gas and there is a believed to be a lower gradient of heat transfer throughout the X and Y coordinates of the baseplate.

It should be noted that in one form, in the lower portion, there is one heat exchanger that is adapted to be used for cooling the product after it has finished pasteurizing. Essentially, the tube cooler located in the lower portion will cool the milk to a desirable temperature such as to a calf feeding temperature which is typically about 100° F. The tube coolers and the water passing therethrough in the countercurrent flow arrangement comes out warmer, which is either discarded or ran into a trough to give feeding cows warm water for direct consumption.

In one form in the lower lateral portion, there can be a bank array of solenoid valves in fluid communication with hot and cold water sources whereby the PLC controller will control these at various time portions during the run cycle to allow the various functions described above, such as after the milk is pasteurized, the PLC controller allows the product to pass through the lower heat exchanger where the cold water valve is open in a countercurrent flow arrangement to cool the milk and essentially warm the cool water passing therethrough.

The transition from pasteurization to cooling is done in a batch process as well where the fluid is circulated through the heat exchanger contained in the lower region to bring it to the calf feeding temperature. The PLC controller is fully adjustable by the user for the heating temperature and the cooling temperature time durations. In one preferred form, once the pasteurizing is done and the temperature is brought to the appropriate level for calf feeding, the machine unit subset shuts off and is done the batch process.

SUMMARY OF THE DISCLOSURE

Recited below is a pasteurization unit for pasteurizing milk product. The pasteurization unit comprises a force convection chamber having a central chamber region with a lower separator plate. The force convection chamber further has a first region having an injection nozzle that is adapted to be positioned near the lower separator plate.

There is further a direct heating system comprising a combustion chamber positioned below the lower separator plate of the force convection chamber. The direct heating system has a combustion nozzle adapted to disburse and propagate a flame throughout the combustion chamber. An exhaust outlet is in communication with the combustion chamber adapted to eject combustion gas therefrom.

There is further a fluid convection system comprising a fluid pump in communication with the ejection nozzle and adapted to transmit milk product through the nozzle. A recirculation conduit is in communication with the central chamber region to allow milk product to circulate therethrough.

The milk product returning from the recirculation conduit is adapted to recirculate to the fluid pump and the ejection nozzle is positioned in a manner within the central chamber region to transmit milk product therethrough and create a flow of milk product across the lower separator plate to prevent overheating of the milk product and to allow pasteurization of the same.

BRIEF DESCRIPTION OF THE DRAWINGS

FIG. 5 shows a partial sectional view along the lateral axis showing the ejection of milk product through the milk product mass.

DETAILED DESCRIPTION OF THE PREFERRED EMBODIMENTS

Figure 3:
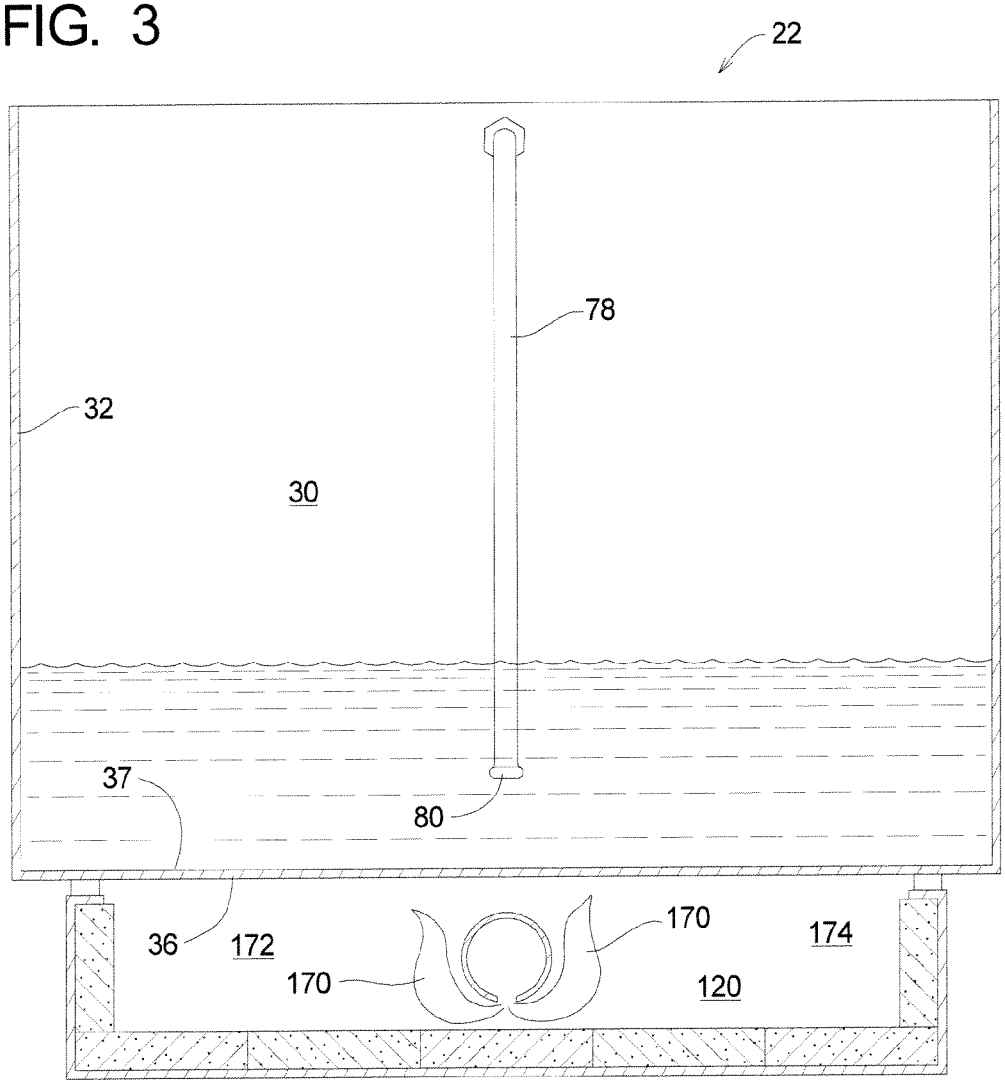
FIG. 3 shows a cross-sectional view taken along the longitudinal axis of the device showing the milk product mass with the nozzle positioned therein and illustrating the flame propagation of the combustion chamber.

As shown in FIG. 3, the force convection chamber comprises a central chamber region 30 which is made up of first and second lateral walls 32 and 34 and the lower separator plate 36. Referring back to FIG. 1, the force convection chamber 22 is further comprised of first and second longitudinal walls 38 and 40 and in one form, has an upper open region 42. The upper open region can be covered by a like device or remain open during the pasteurization batch process. The first and second longitudinal lateral walls in conjunction with the lower separator plate should form a hermetically sealed region which is defined as the central chamber region. As shown in FIGS. 3 and 5, the central chamber region 30 is adapted to hold a milk product mass 60 therein. The milk product mass 60 has an upper milk surface 62 which can be at a variety of heights but is below the upper open rim 44 which defines the upper open region 42 introduced above. Preferably, as described further below, the upper milk product surface 62 is above the ejection nozzle 80 described further herein.

The lower separator plate in a preferred form is made from stainless steel, as are the other walls comprising the force convection chamber 22. However, other forms of materials could be utilized which are conducive to be used with milk products in the various standards placed around the handling of milk products.

Figure 1:
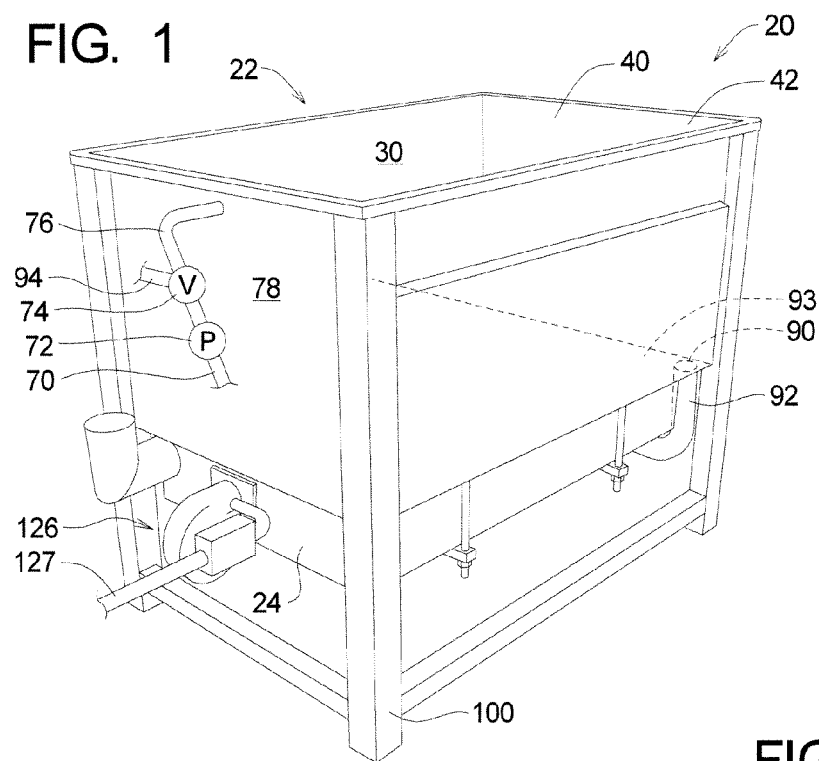
FIG. 1 shows an isometric view of the pasteurization unit.

The fluid convection system 26 as shown in FIG. 1 essentially comprises a fluid line 70 that is in communication with the fluid pump 72. An assortment of valves such as 74 can be placed along the fluid line 70 for selecting the milk product median to be redirected about various conduit paths described herein.

The fluid line 70 comprises an input line 76 which is downstream of the fluid pump 72 and as shown in FIGS. 3 and 5, in communication with the chamber line 78. The chamber line 78 in a preferred form extends downwardly within the central chamber region 30 and is in communication with the ejection nozzle 80. Essentially, the ejection nozzle 80 as shown in FIG. 5 is adapted to violently and in a force convection manner eject milk therefrom as indicated by arrow 82. The ejection nozzle is positioned adjacent to the lower separator plate 36 to induce a relatively high flow rate thereabove. The ejection nozzle as indicated by dimension 84 is within a few inches of the separator plate 36. Pursuant to milk product handling standards by a variety of authorities, a sufficient spacing of the chamber line and the ejection nozzle should be arranged for proper cleaning of the unit. In other words, the items should be properly spaced apart to allow inspection and cleaning to prevent bacterial growth.

As shown in FIG. 1, in one region of the forced convection chamber an ejection port 90 is positioned which is in communication with a recirculation line 92 that in some form is in communication with the fluid line 70 as shown in the left-hand portion of FIG. 1. In other words, FIG. 1 schematically shows the recirculation line 92 where the positioning of an orientation of the recirculation line in one form can be within the frame 100 and a variety of channels and conduits be adapted to recirculate to the fluid line 70. For example, the recirculation line 92 may be in communication with filters or other processing steps or can be directed back to the fluid line 70 to be pumped through the fluid pump 72 for recirculation.

As described further herein, the preferred form of pasteurization is in a batch process. The ejection port and recirculation line can further be in communication with a transfer line 94 which is schematically shown in the left-hand portion of FIG. 1. Essentially, a valve such as that shown at 74 can redirect the fluid to a transfer line 94 so the fluid pump 72 would transfer the pasteurized milk product to such a location for proper storage or direct bottling. In other words, the transfer line 94 can be used to fill small milk bottles that are adapted to be distributed to calves for feeding of the same. Alternatively, the transfer line 94 could be in communication with a spray-type nozzle where in a cleaning mode, the spray nozzle could manually be used by an operator to spray out and clean the force convection chamber 30. This illustrates the versatility of utilizing the pump 72 for various functions. The ejection port 90 can be positioned in a variety of locations within the central chamber region 30. In one form, the ejection port 90 can be positioned in a corner area 93 that is perhaps a lower region of the lower separator plate 36 where the upper surface 37 of the lower separator plate is adapted to utilize the gravitational force acting on the fluid to transfer it to the low spot where the ejection port 90 is located. This would occur when the fluid is not ejected through the ejection nozzle, and essentially the milk product mass 60 is being drained from the central chamber region 30 (see FIG. 5).

There will now be a description of the direct heating system 24 with initial reference to FIG. 1.

To recapitulate, essentially there is a force convection chamber 22 that is adapted to store milk product and provide a heat transfer to the lower separator plate 36. The lower separator plate is in direct thermal communication with a combustion chamber 120 described herein.

It should be noted that the lower separator plate as shown in FIGS. 3 and 5 is essentially in direct thermal communication with the combustion chamber 30 described herein. In other words, instead of having a thermal capacitance layer such as a boundary of steam and water add atmospheric pressure to limit the upper temperature, essentially, the pasteurization unit 20 relies on the convection of the milk product from the ejection nozzle 80 to prevent overheating. Therefore, without the force convection of the milk product through the ejection nozzle 80, the milk product mass 60 may scald rather quickly the lower portions 61 indicated in FIGS. 3 and 5.

Figure 2:
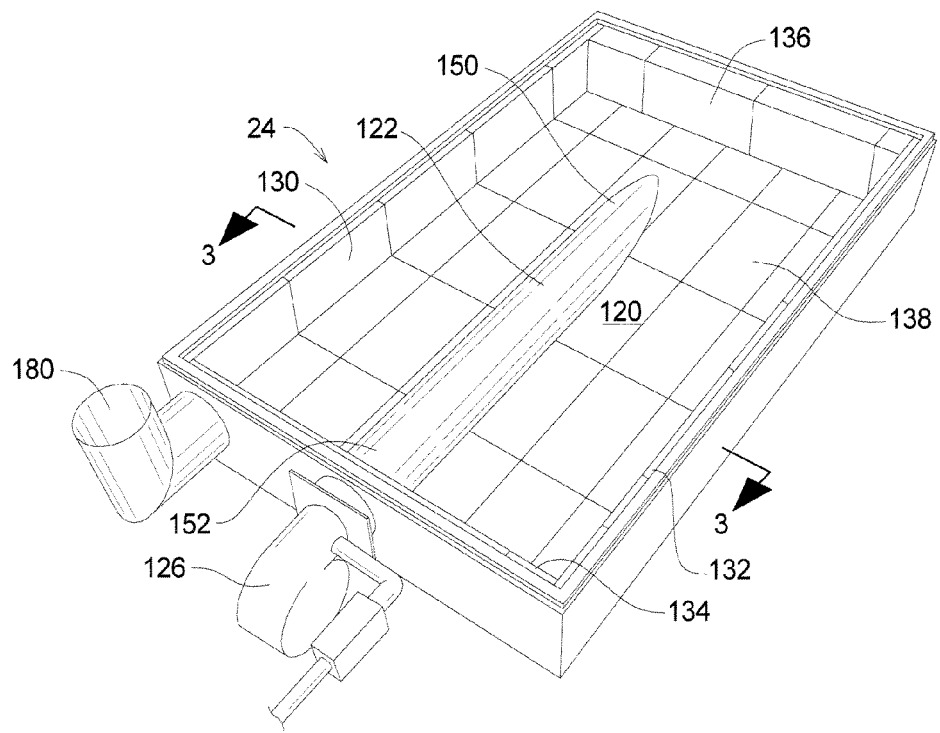
FIG. 2 shows an exposed isometric view of a combustion chamber.

With the above-mentioned background information in mind, reference is now made to FIG. 2 where the direct heating system 24 comprises a combustion chamber 120 and a combustion nozzle 122. The direct heating system 24 further comprises an air/fuel compressor 126 that is in communication with the combustion nozzle and adapted to provide fuel thereto.

Figure 4:
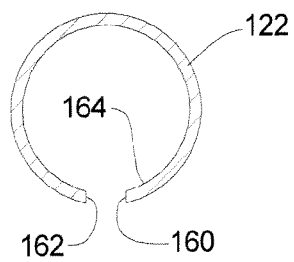
FIG. 4 shows a cross-sectional view of the combustion nozzle.

As shown in FIG. 2, the combustion chamber 120 is comprised of first and second lateral walls 130 and 132 and first and second longitudinal walls 134 and 136. Further, there is a combustion chamber comprised of the lower base wall 138. Now referring to FIG. 5, the combustion chamber 120 is finally comprised of a lower surface 140 of the lower separator plate 36. The walls 130, 132, 134, 136, and 138 shown in FIG. 2 in a preferred form are comprised of some form of firebrick to properly maintain the heat therein given its insulating properties and not combust or otherwise break down due to the intensity of the combusted flame. However, the lower separator plate is comprised of a thermally conductive material such as stainless steel or any other suitable material where heat is transferred from the combustion chamber directly through the lower separator plate to be conducted to the milk product mass 60. Referring back to FIG. 2, the combustion nozzle 122 comprises a forward portion 150 and a rearward portion 152. As shown in FIG. 5, the upper forward portion 154 is positioned further in the lower forward portion 156. As shown in FIG. 4, a flame propagation slot am 160 defined by the surfaces 162 and 164 extends therealong the lower portion 166 as shown in FIG. 5. As shown in FIG. 3, the flame propagation slot 160 adapted to disperse a flame 170 therealong the lateral portions 172 and 174 of the combustion chamber 120.

As shown in FIG. 2, an exhaust outlet 180 is in communication with the combustion chamber 120 to allow combusted gas to exhaust therefrom. As shown in FIG. 1, the fuel compressor 126 is in communication with a duel line 127 that can be connected to any type fuel supply such as a natural gas or propane line or a natural gas and propane tank or other form of combustible material.

It should be noted that the direct heating system 24 in the broader scope could be other heating methods such as electric burner plate, a wood burner, or any other heat source which incites a high temperature that could scald milk.

With the foregoing description in mind, there will now be a description of the method of using the pasteurization unit 20. Essentially, the fluid pump 72 as shown in FIG. 1 can initially pump milk product from a milk supply into the central chamber region 30 of the force convection chamber 22.

Essentially, a variety of valving and pumping methods can be utilized to fill the force convection chamber 22. However, in a preferred form, a valve similar to the valve indicated at 74 can redirect the fluid line 72 to be in communication with a milk supply which is not shown in FIG. 1. After the chamber is full with a milk product as shown in FIGS. 3 and 5, pressurized milk product is recirculated through the input line 76 by way of the fluid pump 72 and ejected out of the nozzle 80. The fluid pump 72 draws fluid from the ejection port 90 where the milk product mass is recirculated in a batch-like process. At some point, the fuel compressor 126 is activated and an igniter ignites the fuel to provide a direct heat source. As shown in FIG. 3, the direct heat source indicated by the flames 170 provides a heat transfer to the lower separator plate 36 which is conducted to the milk supply 60.

It should be reiterated that the nozzle 80, which can be of a variety of arrangements, forcefully thrusts the milk product in a turbulent manner to prevent any amount of the milk product from being in contact with the upper surface 37 of the lower separator plate 36. In other words, instead of relying upon natural convection of the milk product to recirculate the milk, the force convection of the milk allows for a more uniform heating and further, more importantly, prevents scalding of the milk. The heat transfer from the propagated flames 170 can be rather significant although it is not specifically quantified. However, if the milk supply 60 were to remain static, the applicant would have a high level of confidence that the milk would scald and essentially overheat at certain portions, which would ruin the batch.

As shown in the table below, there are a variety of temperatures and associated times that relate to the temperature of the milk product and time at that particular temperature to properly pasteurize the milk.

| Temperature (° C.) | 63 | 72 | 89 | 90 | 94 | 96 | 100 |
|---|---|---|---|---|---|---|---|
| Time (seconds) | 1800 | 15 | 1 | 0.5 | 0.1 | 0.05 | 0.01 |

Essentially, the force convection of the milk product by the nozzle allows for a more substantial uniform temperature about the milk product mass 60. Therefore, temperature transducers can be strategically positioned within the central chamber region 30 to properly measure the temperature and the PLC controller can record this temperature reading and utilize it for a decision-making process. Basically, the PLC controller can be controlled to properly pasteurize the milk product preprogrammed table similar to the table shown above, where essentially the milk is heated at a sufficient temperature for a sufficient length of time.

After the milk is properly pasteurized, a valve such as that shown schematically at 74 in FIG. 1 can be activated to redirect the fluid to a transfer line 94 for proper storage or direct use of the milk product. In one form, the fluid pump 72 can have another function of pumping the milk product to a supply location such as a bottling procedure where the milk product is bottled for consumption of calves or animals. In one form, the pasteurization unit 20 is utilized in a small-scale such as directly on a dairy farm or beef cattle farm where it is desirous to have pasteurized milk given to calves or other animals. it should be noted that the standards of pasteurization for nonhuman consumption are different than the standards for human consumption.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicant's general concept.

Therefore I claim:

1. A pasteurization unit for pasteurizing milk product, the pasteurization unit comprising:
   a) a force convection chamber having a central chamber region with a lower separator plate, the force convection chamber further comprising a first region having an injection nozzle that is adapted to be positioned near the lower separator plate,
   b) a direct heating system comprising a combustion chamber positioned below the lower separator plate of the force convection chamber, the direct heating system comprising a combustion nozzle adapted to disburse and propagate a flame throughout the combustion chamber, an exhaust outlet in communication with the combustion chamber adapted to eject combustion gas therefrom,
   c) a fluid convection system comprising a fluid pump in communication with the ejection nozzle and adapted to transmit milk product through the nozzle,
   d) a recirculation conduit in communication with the central chamber region to allow milk product to circulate therethrough,
   e) whereas milk product returning from the recirculation conduit is adapted to recirculate to the fluid pump and the ejection nozzle is positioned in a manner within the central chamber region to transmit milk product therethrough and create a flow of milk product across the lower separator plate to prevent overheating of the milk product and to allow pasteurization of the milk product.

2. The pasteurization unit as recited in claim 1 whereby the fluid pump is further adapted to pump milk product from the central chamber region to a milk dispersion location.

3. The pasteurization unit as recited in claim 1 whereby the compression nozzle is an upper surface that extends beyond a lower surface of the combustion nozzle to allow a proper flame propagation throughout the combustion chamber.

4. The pasteurization unit as recited in claim 1 whereby the central chamber region is defined by stainless steel walls.

5. The pasteurization unit as recited in claim 4 whereby the lower separator plate is a stainless steel plate directly separate in the combustion chamber from the central chamber region.

6. The pasteurization unit as recited in claim 1 whereby the ejection nozzle is placed below an upper milk product surface of the milk product mass contained within the central chamber region.

7. The pasteurization unit as recited in claim 1 whereby the combustion chamber has first and second lateral walls and first and second longitudinal walls and a lower base wall is comprised of firebrick.

8. The pasteurization unit as recited in claim 7 whereby the upper wall of the combustion chamber is the lower separator plate which is less than ⅜ of an inch stainless steel.

9. The pasteurization unit as recited in claim 1 whereby a PLC controller is adapted to operate the fluid pump and a fuel compressor of the direct heating system for a predetermined amount of time.

10. The pasteurization unit as recited in claim 1 whereby the nozzle is adapted to provide a force convection turbulent flow of the milk product across an upper surface of the lower separator plate.

11. The pasteurization unit as recited in claim 10 whereby the force convection breaks up or prevents hemoglobin clumps within the milk product.

12. The pasteurization unit as recited in claim 9 whereby the pasteurization of the milk product is done so in a batch process.

* * * * *